US011184653B1

(12) United States Patent
Hegar et al.

(10) Patent No.: US 11,184,653 B1
(45) Date of Patent: Nov. 23, 2021

(54) ARCHITECTURE AND ALGORITHMS FOR HIGH AVAILABILITY STATMUXING

(71) Applicant: Amazon Technologies, Inc., Seattle, WA (US)

(72) Inventors: Ryan Hegar, Happy Valley, OR (US); Erik Jason Johnson, St. Helens, OR (US); Mohamed Anouar Hadj Taieb, Burnaby (CA); John Bach, Roswell, GA (US); Ai Luo, Camas, WA (US); Rodney Monsees, Portland, OR (US); Gadi Yechiel Golan, Portland, OR (US); Eric Woodruff, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 142 days.

(21) Appl. No.: 16/712,751

(22) Filed: Dec. 12, 2019

(51) Int. Cl.
*H04N 21/2365* (2011.01)
*H04N 21/236* (2011.01)
*H04N 21/234* (2011.01)

(52) U.S. Cl.
CPC . *H04N 21/23655* (2013.01); *H04N 21/23424* (2013.01); *H04N 21/23608* (2013.01)

(58) Field of Classification Search
CPC ....... H04N 21/23655; H04N 21/23608; H04N 21/23424
See application file for complete search history.

(56) References Cited

U.S. PATENT DOCUMENTS

2006/0018254 A1* 1/2006 Sanders ........... H04N 21/23655
370/216
2017/0150194 A1* 5/2017 Blestel ............. H04N 21/23424

\* cited by examiner

*Primary Examiner* — Vinncelas Louis
(74) *Attorney, Agent, or Firm* — Nicholson De Vos Webster & Elliott, LLP

(57) ABSTRACT

Techniques for using statmuxes are described. In some examples, each statmux is to perform activities such as receiving complexity and quality data per frame per encoder of each channel of a first zone of a provider network, wherein a first channel of the first zone is associated with a first source and a second channel of the first zone is associated with a second source; receiving complexity and quality data per frame per encoder of each channel of a second zone of the provider network, wherein a first channel of the second zone is associated with the first source and a second channel of the second zone is associated with the second source; determining, based on the received complexity data and quality data, which channels are to be active, wherein an active channel's content data is to be included in the multi program transport stream output; providing an indication to the channels of which channels have been determined to be active based upon the encoder determination; receiving content data from the encoders of the active channels; and generating a multi program transport stream output from the received content data.

20 Claims, 10 Drawing Sheets

|  | ENCODER A (PREFERRED) 603 | | |
|---|---|---|---|
| SELECTION MATRIX 601 | HEALTHY | UNHEALTHY | DEAD |
| ENCODER B (NOT PREFERRED) 605 — HEALTHY | A | B | B |
| UNHEALTHY | A | UNCHANGED | B |
| DEAD | A | A | UNCHANGED |

FIG. 6

ARCHITECTURE AND ALGORITHMS FOR HIGH AVAILABILITY STATMUXING

BACKGROUND

Multiple program transport streams (MPTS) carry the payload for multiple channels and thus the consequence of a MTPS stream failing is significant. Redundancy is critical to ensure high availability and fast recovery when problems occur.

BRIEF DESCRIPTION OF DRAWINGS

Various embodiments in accordance with the present disclosure will be described with reference to the drawings, in which:

FIG. 6 illustrates an example of a selection matrix to be used in determining when encoders should be switched according to some embodiments.

DETAILED DESCRIPTION

The present disclosure relates to methods, apparatus, systems, and non-transitory computer-readable storage media for providing high availability statistical multiplexing. A statistical multiplexer (statmux) controls a bitrate at which a set of encoders encode video to maximize video quality while ensuring the statmux can multiplex the audio, video, data and program specific information (PSI) tables into a constant bitrate (CBR) multiple program transport stream (MPTS). Statmuxes are often responsible for delivering channels over the air or over satellite for delivery to TV subscribers.

Disclosed herein are embodiments to help achieve higher availability multiplexing using statmuxes. In particular, a redundant architecture, methods for choosing an active encoder for each program, and tenants to minimize a disruption on an MPTS output upon a failover between encoders are detailed.

At a high level, achieving high availability requires that the statmux is able to continue to produce clean output in the face of input loss to encoders, encoder failures, multiplex failures, and network problems, which is not available in traditional non-statmuxing systems. That is partially satisfied through an architecture that includes redundant encoders and statmuxes distributed across zones and intercommunication between the statmuxes and encoders.

With two or more encoders per channel, each statmux decides which encoder is active (for example, which encoder output is passed to the MPTS output) and when to failover to the other encoder of the channel Detailed herein are multiple factors used to decide which encoder should be active at any given point in time.

Additionally, each statmux chooses an active channel based on a combination of one or more of: quality scores in the complexity packets coming from each channel; whether or not each channel's complexity packets contain discontinuities, are dropped, or are late; whether or not a clock recovery algorithm on complexity packets is locked for each channel; and/or a zone for each channel and the primary multiplex pipeline identification (which may be used as a tie breaker). These factors are measured in defined epochs (such as in one second intervals) on both active and inactive encoders and that data is used to decide when a failover to the backup encoder is needed.

Figure 1:
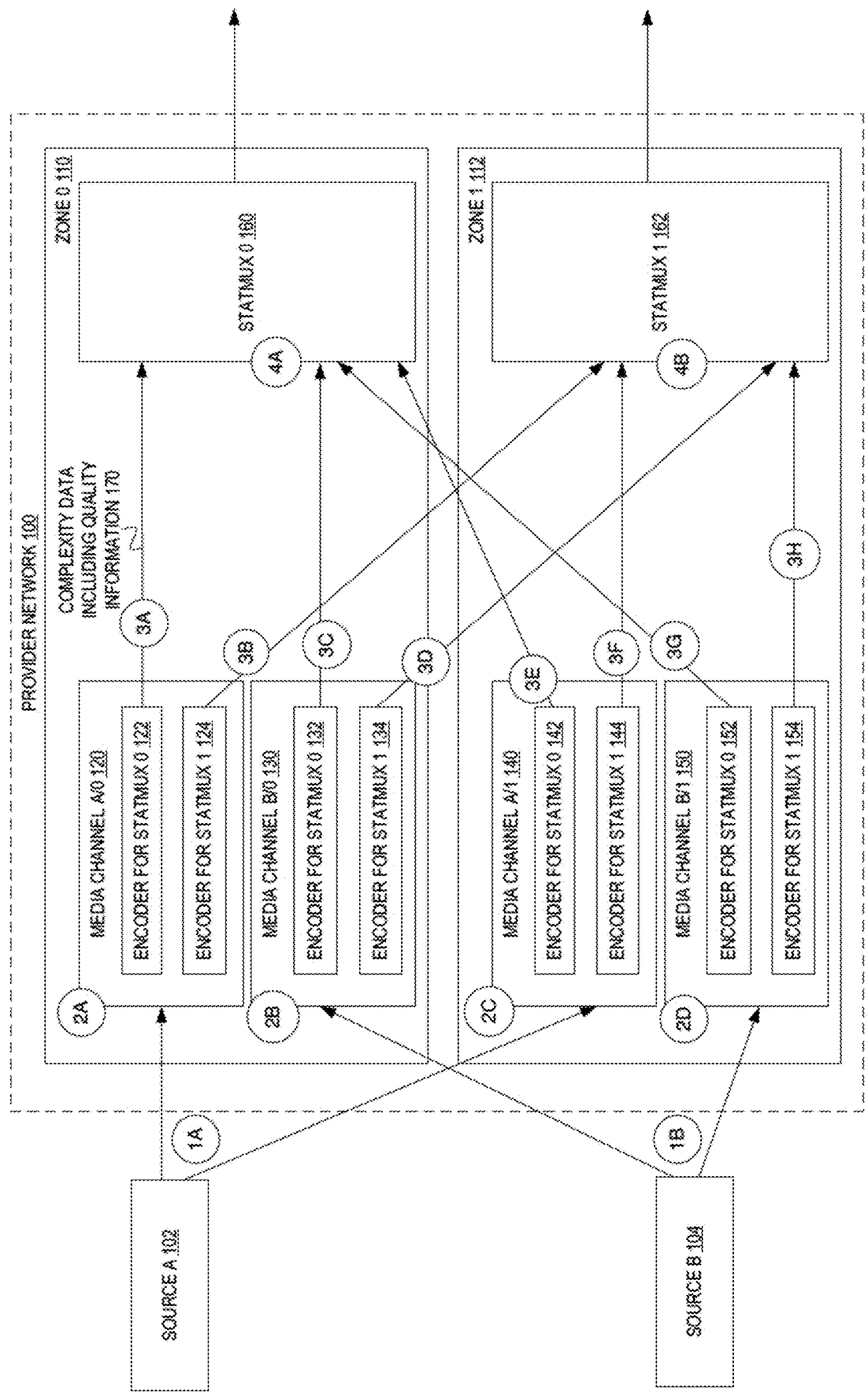
FIG. 1 illustrates embodiments of statmuxing using redundant media channels and different zones.

FIG. 1 illustrates embodiments of statmuxing using redundant media channels and different zones. As shown, each zone (zone 0 110 and zone 1 112) includes a plurality of media channels (media channel A/0 120, media channel B/0 130, media channel A/1 140, and media channel B/0 150) which ingest and transcode content from upstream source A 102 and source B 104. As shown, each source 102, 104 has two channels dedicated to it such both channels work independently of each other, but process the same content. Note that the capabilities of a channel at any given point in time may be different than a channel processing the same content.

In this example, zone 0 110 has been designated the "preferred" or "primary" zone. The channels 120, 130 within this zone 0 110 are therefore also designated as "preferred." As such, all things being equal, the output generated from these channels 120, 130 will be used by the statmux 0 160 to generate a MPTS instead of output from the secondary media channels 140, 150 of the secondary zone 1 112.

As illustrated, each channel 120, 130, 140, 150 includes one or more encoders to generate content for a particular statmux. For example, channel A/0 120 (the preferred channel for source A) includes an encoder for statmux 0 122 and an encoder for statmux 1 124 for the content from source A 102. Source A 102 also communicates with channel A/1 140 that includes an encoder for statmux 0 122 and an encoder for statmux 1 124. Similarly, source B 104 communications with preferred channel 130 (and encoders 132 and 134) and channel 150 (and encoders 152 and 154). By having the output of each channel be received by both statmuxes 160, 162, a first form of redundancy is present. Note that in some embodiments, the output of each channel is sent to a particular IP address for particular statmux to access.

The generated output from an encoder contains at least a specific combination of a video stream, an audio stream, and/or a captions track. Each encoder of a channel also generates and provides complexity information (for example, as a complexity packet) for each frame to each statmux. For example, complexity packets may contain a sequence number, encoder identifier, start and end timestamps for the associated frame, and/or a complexity score. This information is used in the statmuxes 160, 162 for clock recovery, bitrate allocation, and interleaving. In some embodiments, this complexity information further includes a quality score such as a floating point number between 0.0 and 1.0. The quality score indicates the quality of the input, etc. In some embodiments, the quality score will be 0.0 when the frame associated with the complexity packet is from frame sync fill or slate, or 1.0 when the frame associated with the complexity is from the event's input. In some embodiments, the quality score might include some combination of the following: 1) whether or not the demuxer detected continuity errors for this input; 2) whether or not the bitrate responses are being received on time; and 3) the speed versus quality setting of the encoder for the frame. This information allows the statmuxes 160, 162 to decide which channel is active and which is inactive at any point in time.

Based on the complexity data and quality scores received, each statmux 160, 162 will generate rate control information back to every encoder that indicates how to encode each frame (e.g., the bit rate, etc.). The rate control information includes a sequence number, encoder identifier, start and end timestamps (matching the complexity packet), a priority field, and a bitrate allocation for the associated frame. In some embodiments, the rate control information includes an indication of whether that encoder should be active or inactive.

The receiving encoder within a channel prioritizes rate control information using the priority field in each rate control information packet. For any given frame, the encoder in a channel accepts the highest priority rate control information response that arrives in time. In some embodiments, the priority field will be used as follows: a highest priority is assigned to bitrate response packets from the primary statmux to an active channel; a second highest priority is assigned to bitrate response packets from the secondary multiplex to an active channel; a third highest priority is assigned to bitrate response packets from the primary multiplex to an inactive channel; and a lowest priority is assigned to bitrate response packets from the secondary multiplex to an inactive channel. In some embodiments, an additional indication is provided with the rate control information to indicate whether a channel should suppress its output to a statmux.

In some embodiments, one or more of the following tenets apply: 1) each statmux communicate with an independent channel encoder to ensure that any encoder never needs to select between priorities of different pipelines or determine whether or not to suppress output in the face of conflicting requests; and 2) for a typical statmux, there will be two statmuxes and two channels, each channel will be running two, separate encoders, both working on the same input, send to different outputs. This has many benefits, including: a single channel encoder will only ever receive bitrate allocations from a single statmux. These allocations might be at different priorities, but for any single packet, there will ever only be one allocation, and the statmux will know about when the bitrate priorities change and will be able to understand exactly how many bits are allocated to each program it is receiving.

Examples of an upstream source include, but are not limited to: a streaming camera or appliance that is directly connected to the internet, a contribution encoder that is located in remote location, etc. The content from source A 102 and source B 104 is in a specific package format and protocol. For example, the source content might be available as HTTP Live Streaming (HLS) or transport streaming (TS). The source content contains video, audio, and optional captions streams that are in specific codecs or formats.

Not shown are one or more downstream components that are the destinations for the output from one or both zones 110, 112. A typical downstream components consists of an origin service or a packager that is connected to the statmuxes 160, 162, a content distribution network (CDN) that is downstream of the origin service or the packager, and a playback device or website where the users view the content.

Minimizing the disruption observable on the MPTS output when a failover from one encoder to the other encoder occurs may be accomplished using one or more prioritized factors, including, but not limited to: not overflowing a statmux, switching on an I-frame, switch away at a presentation time stamp (PTS) that is close to the failover encoder's, switching away from a first encoder after an I- or P-frame to avoid a fame in the output with invalid references, causing the generation a particular frame type (e.g., an I-frame), etc.

In some embodiments, the zones 110 and 112 are a part of a provider network 100. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/ storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/ deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) (such as zone 0 110 and zone 1 112) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The numbers with circles in them illustrate an exemplary flow of providing content, complexity information, and quality information in the use of statmuxes.

At circles 1A and 1B, source A 102 and source B 104 transmit content to both zones. In particular, each source sends content to a channel in each zone.

The channels in each zone encode the received content at circles 2A-2D. Note that each channel has an encoder per statmux. Complexity data, including quality information, is sent from each encoder to its statmux at circles 3A-3G. In some embodiments, encoded content also is sent from a proper subset of the channels (e.g., the active channels).

The complexity data is received at circles 4A and 4B by the statmuxes 160, 162. It is at least partially from this data that the statmuxes 160, 162 determine which media channel (and/or encoders) are to be active.

Figure 2:
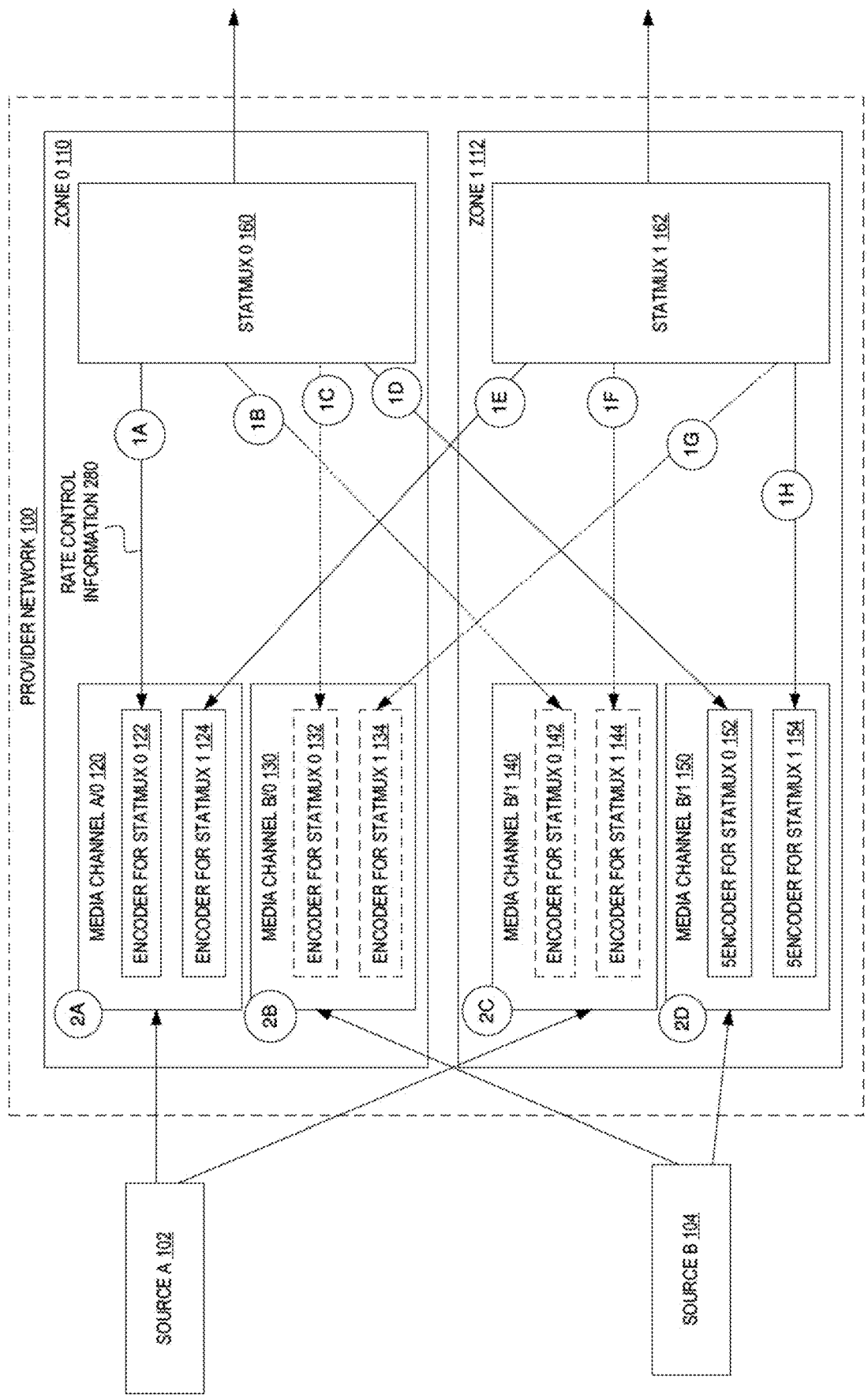
FIG. 2 illustrates embodiments of statmuxing using redundant media channels and different zones.

FIG. 2 illustrates embodiments of statmuxing using redundant media channels and different zones. This illustration shows rate control information 280 being provided from the statmuxes 160, 162 to the channels 120, 130, 140, and 150 at circles 1A-1H. In particular, that rate control information 280 is sent to an encoder of a channel such that both encoders of a given channel receive rate control information, albeit from different statmuxes.

In this example, the statmuxes 160, 162 have determined what encoder is to be active (details on examples of how this decision is made are detailed elsewhere). The solid lines indicate which encoders are to be active and the dashed arrows indicate which encoders are to be inactive. Based on the received rate control information, the active encoder for each channel encodes the content and stream it to its corresponding statmux at circles 2A-2D. Not that in some embodiments, being inactive does not mean that the encoder is not encoding, but merely that it is not sending out its resulting encoded content.

Figure 3:
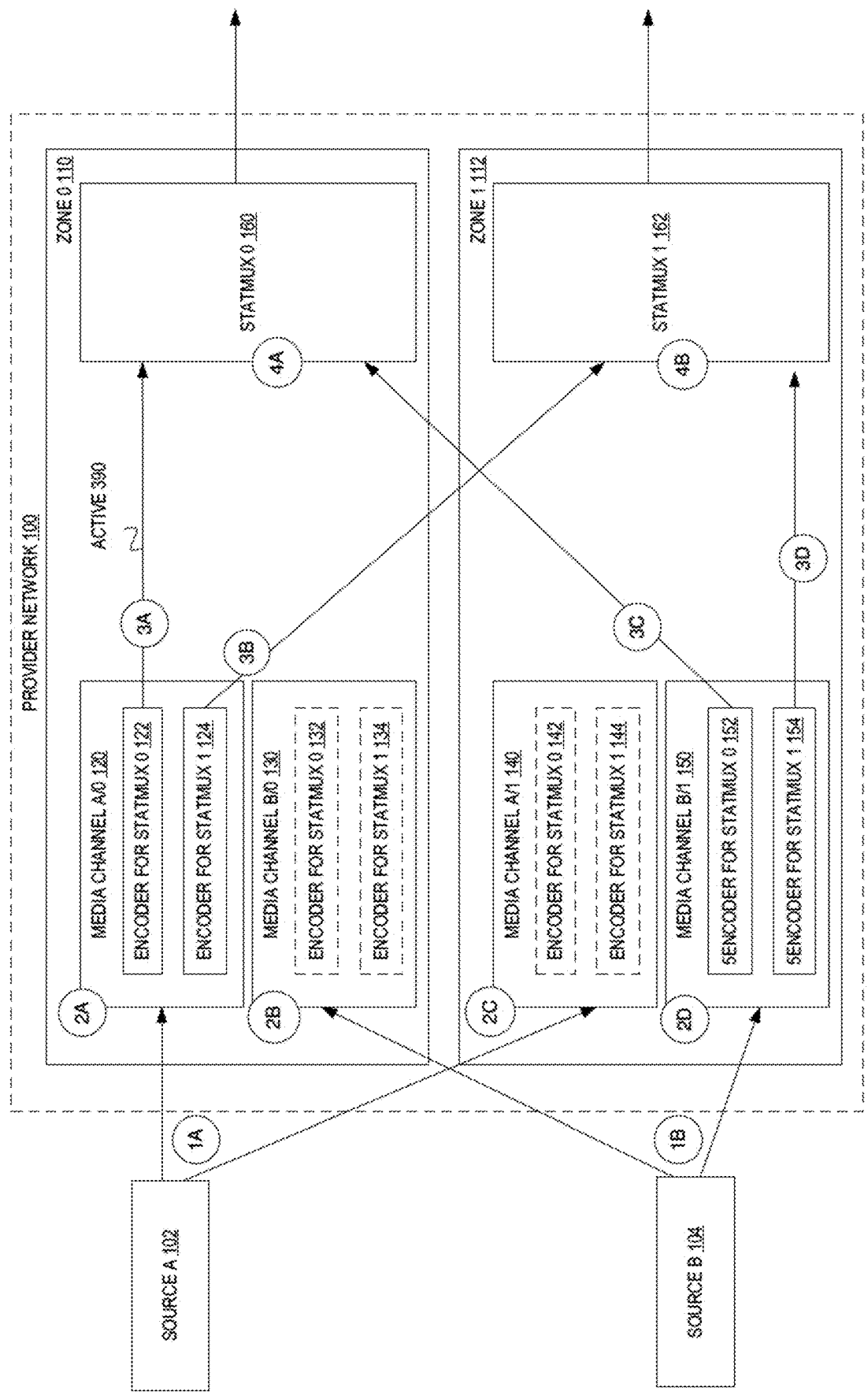
FIG. 3 illustrates embodiments of statmuxing using redundant media channels and different zones.

FIG. 3 illustrates embodiments of statmuxing using redundant media channels and different zones. This illustration shows how active encoding works. As shown, in circles 1A and 1B, source A 102 and source B 104 send content to media channels in each zone.

The encoders 122, 124, 152, and 154 of the active channels (media channel A/0 120 and media channel B/1 150) encode at the rates indicated by the rate control information received from the statmuxes 160, 162 at circles 2A-2D.

In circles 3A-3C, the active encoders send their encoded content to their respective statmuxes as Single-Program Transport Streams (SPTSes). The statmuxes then generate MPTS content from the SPTSes.

Figure 4:
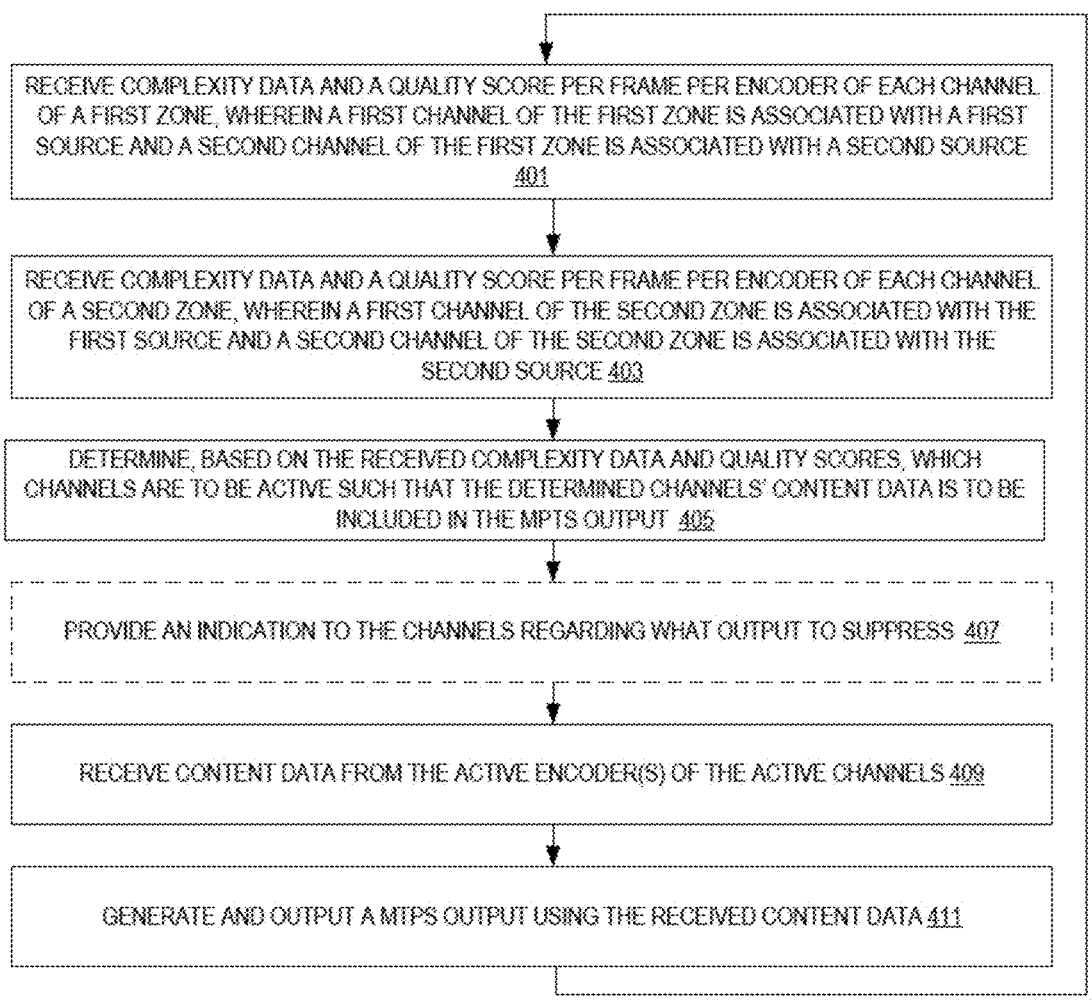
FIG. 4 is a flow diagram illustrating operations of a method for using statistical multiplexing according to some embodiments.

FIG. 4 is a flow diagram illustrating operations of a method for using statistical multiplexing according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the statmuxes of the other figures.

At 401, complexity data and a quality score per frame per encoder of each channel of a first zone is received. Note that a first channel of the first zone is associated with a first video source and a second channel of the first zone is associated with a second source.

At 403, complexity data and a quality score per frame per encoder of each channel of a second zone is received. Note that a first channel of the second zone is associated with the first source and a second channel of the second zone is associated with the second source. As such, the statmux has now received complexity data and quality scores from channels of each zone.

A determination is made, based on the received complexity data and quality scores, of which channels are to be active such that the determined channels' content data is to be included in a MTPS output at 405. A more detailed view of this determination is discussed with respect to FIG. 5.

In some embodiments, an indication is provided to the channels regarding what output to suppress at 407. For example, non-active encoders and channels are to be suppressed. In some instances, output is sent from the inactive channels and discarded at the statmux. This may allow the statmux to be more precise in how and when it switches from/to active and inactive encoders since it has both the active an inactive channel data available to it.

Content data is received from the active encoder(s) of the active channels at 409. This encoded content data is what will be a part of the MTPS output.

Finally, the MTPS generated and output using the received video data at 411.

Figure 5:
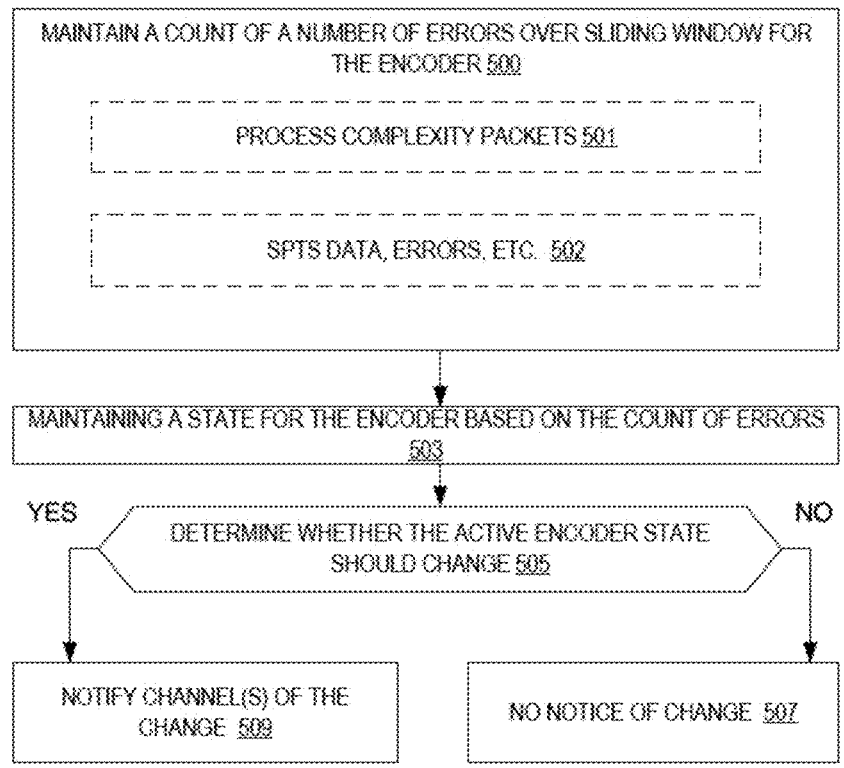
FIG. 5 is a flow diagram illustrating operations of a method for determining an active channel using a statistical multiplexer according to some embodiments.

FIG. 5 is a flow diagram illustrating operations of a method for determining an active channel using a statistical multiplexer according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the statmuxes of the other figures for all encoders that can communicate with the statmuxes such that each statmux maintains information about encoders that it can talk to.

A count of a number of errors over sliding window for an encoder is maintained at 500. In some embodiments, this count is maintained by processing complexity packets at 501. The number of errors is indicative of a potential issue with any given encoder.

A state is maintained for the encoder based on the count of errors over the sliding window at 503. Exemplary states may include, but are not limited to: healthy, unhealthy, and dead. In some embodiments, a healthy encoder is one that has few (e.g., 5) error issues within a sliding window denoting errors; an unhealthy encoder is one that has more error issues than is defined for "healthy," but does not completely take up the sliding window denoting errors; and a dead encoder is one that at least completely takes up the sliding window denoting errors.

A determination of whether the active encoder should change is made at 505. This determination may be based on, for example, a selection matrix such as that shown in FIG. 6. When the determination indicates that a change should be made, then the channels are notified of the change at 509 and when there should be no change, then no notice is sent at 507.

FIG. 6 illustrates an example of a selection matrix to be used in determining when encoders should be switched according to some embodiments. This selection matrix 601 may be used to select between two encoders: a preferred encoder, encoder A 603 and a non-preferred encoder, encoder B 605. Note what may make an encoder preferable has been detailed earlier. In this selection matrix 601 there are 3 levels of granularity: healthy, unhealthy, and dead.

In some embodiments, at startup, the preferred channel encoder should be active. Additionally, after the first complexity packet has been received, errored seconds should not be counted until the clock recovery module has been allowed to synchronize. For example, looking at FIG. 1, channel AO 120 and channel BO 130 are preferred and therefore encoders 122 and 132 for statmux 0 160 should be active and encoders 124 and 134 for statmux 1 162 should be active.

When both channel encoders are healthy, the preferred channel encoder should be active. Again, looking at FIG. 1, the encoders 122, 132 for statmux 0 160 should be active when the encoders are healthy.

When one channel encoder is healthy and one encoder is unhealthy, the healthy channel encoder should be active. For example, looking at FIG. 1, if encoder 122 is unhealthy, then encoder 124 should be active.

When both channel encoders are unhealthy, the active channel encoder should remain unchanged. In other words, there should not be a switch from encoders as it would not make a difference.

When one channel encoder is unhealthy and one channel encoder is dead, the unhealthy channel encoder should be active. For example, if encoder 122 is unhealthy and encoder 124 is dead, encoder 122 should be active.

When a channel encoder is dead and inactive, that channel encoder should never become active. Note, that in the situation where both encoders are dead, one of them should have been active before dying and the state will remain that way.

Figure 7:
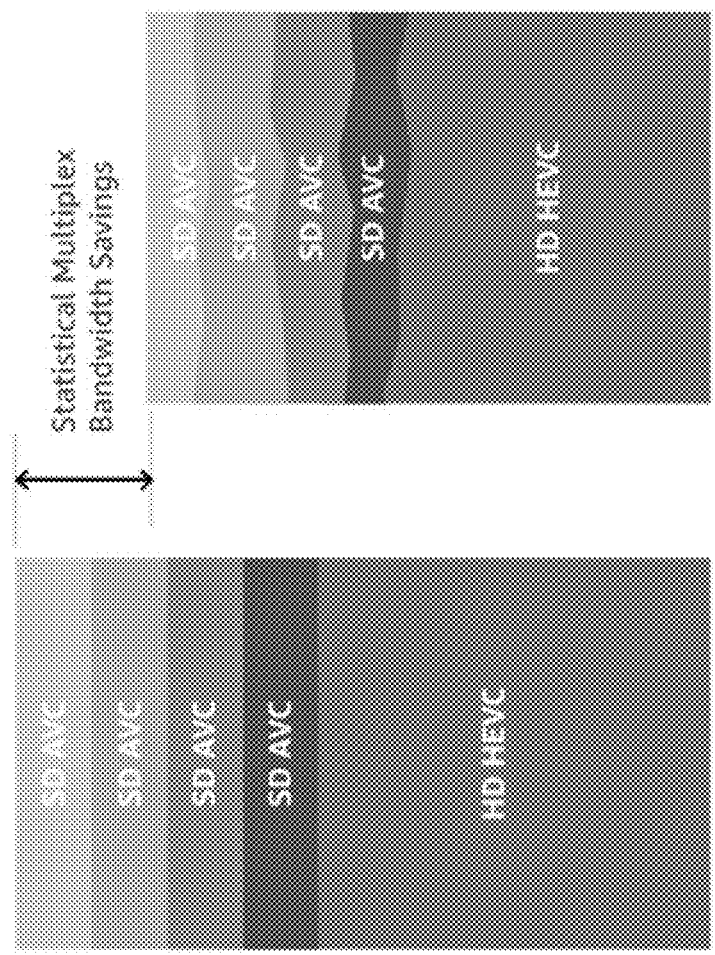
FIG. 7 illustrates exemplary bandwidth savings using statistical multiplexing.

FIG. 7 illustrates exemplary bandwidth savings using statistical multiplexing.

Figure 8:
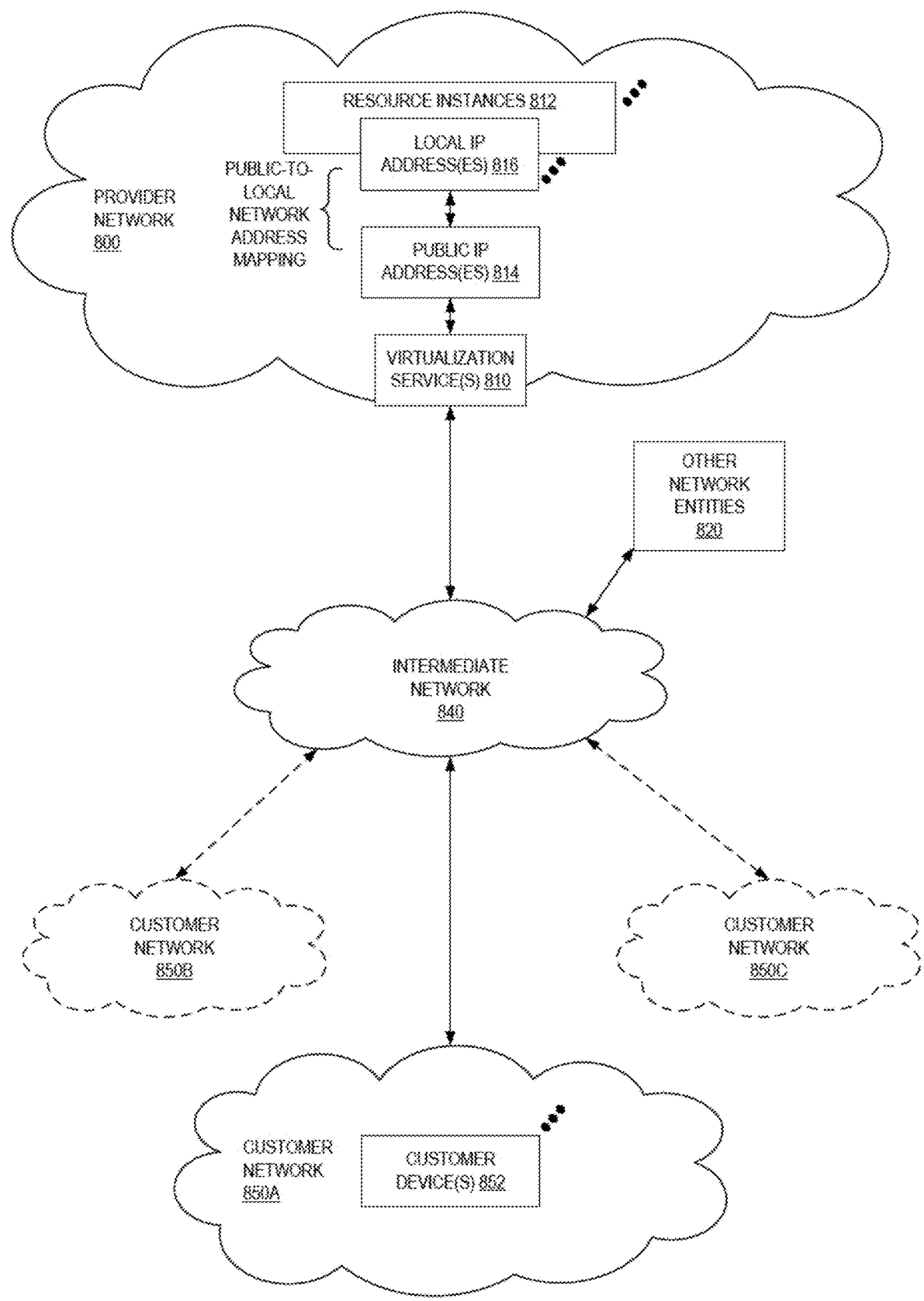
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
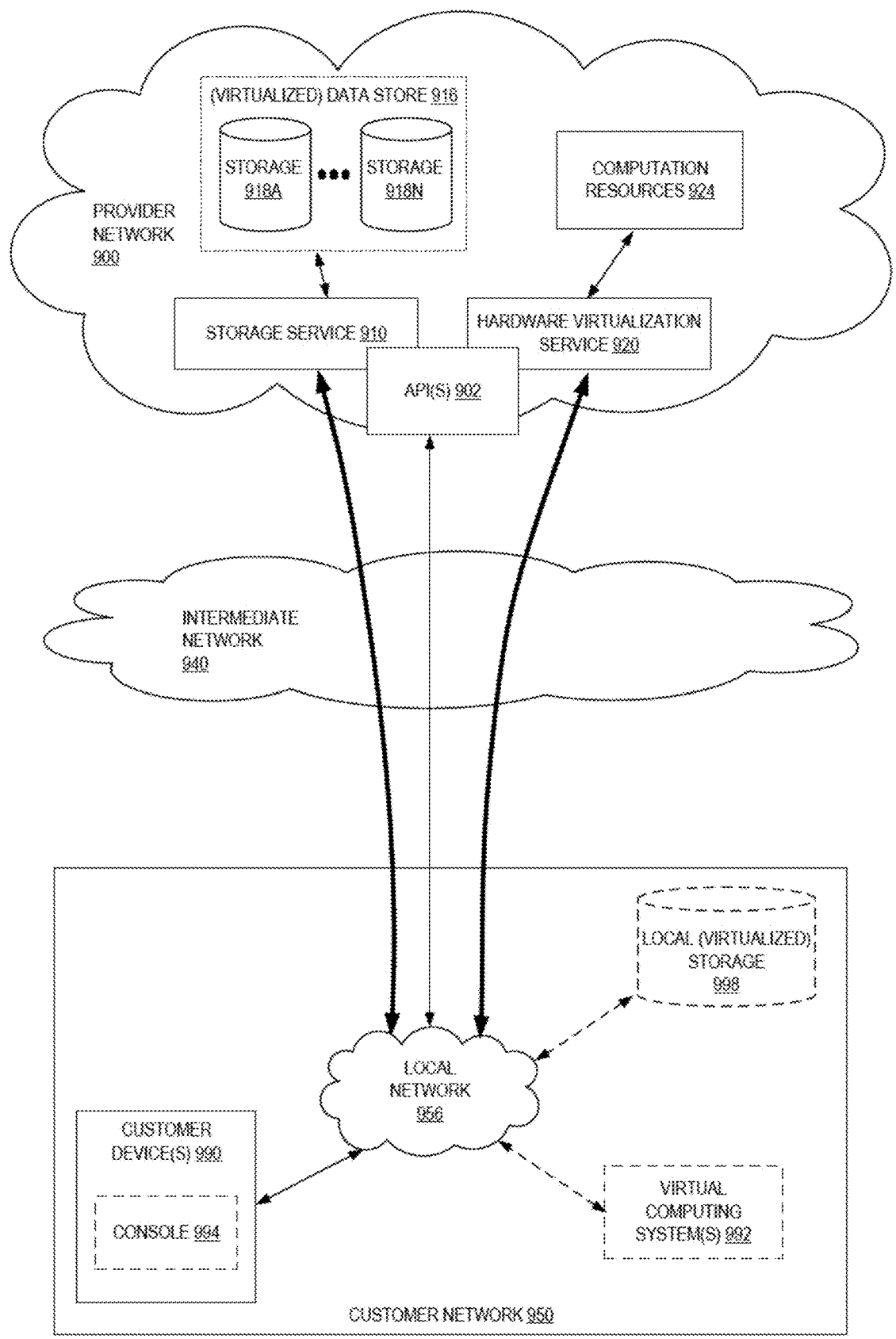
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
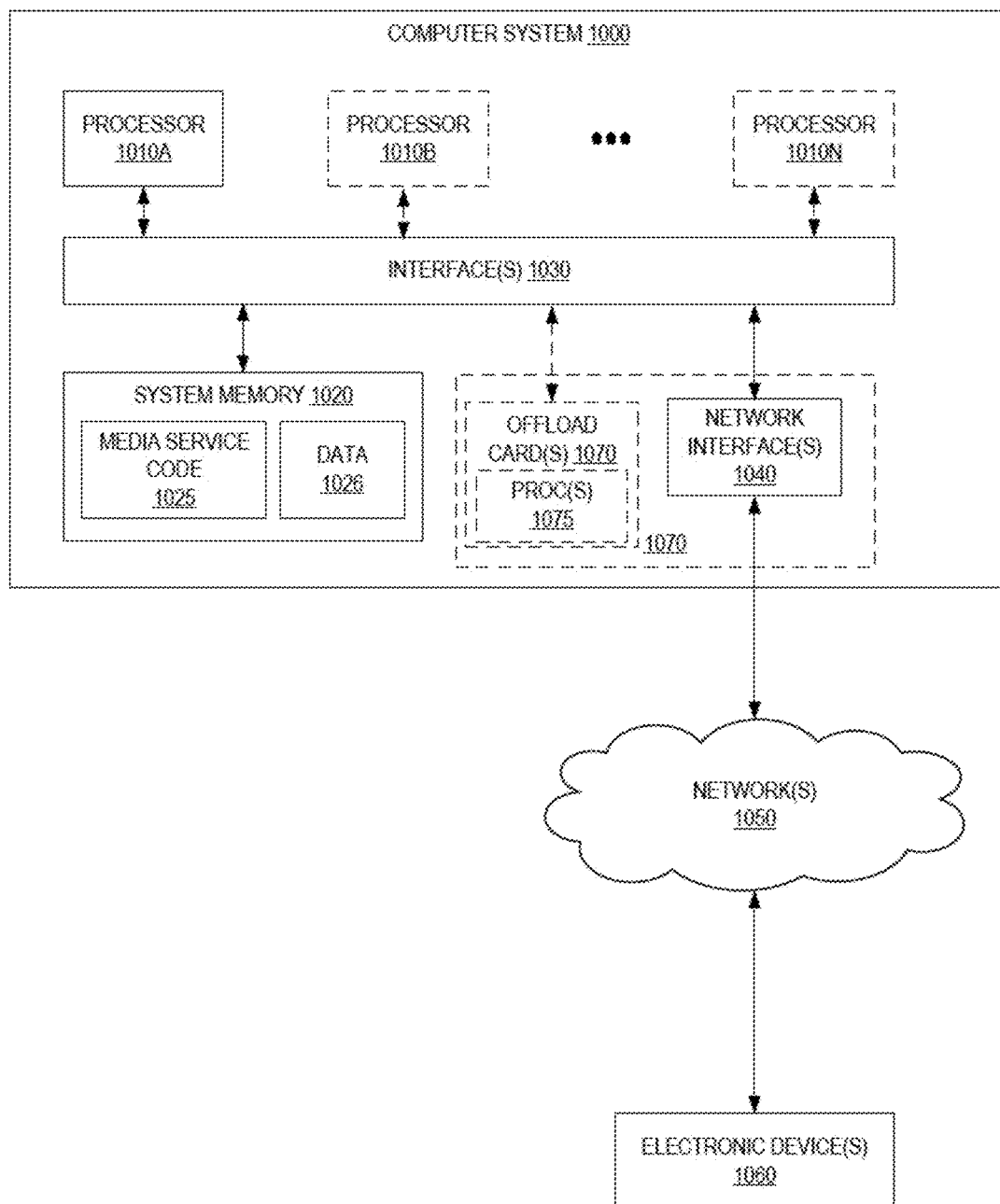
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as media service code 1025 (including statmuxing) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving complexity data and a quality score per frame per encoder of each channel of a first zone of a provider network, wherein a first channel of the first zone is associated with a first source and a second channel of the first zone is associated with a second source;
receiving complexity data and a quality score per frame per encoder of each channel of a second zone of the provider network, wherein a third channel of the second zone is associated with the first source and a fourth channel of the second zone is associated with the second source;
determining, based on the received complexity data and quality scores, which channels are to be active, wherein an active channel's content data is to be included in a multi program transport stream output by:
maintaining a count of a number of errors over a sliding window per encoder,
maintaining a state for each encoder based on the count, and determining active encoders based on the maintained states;

providing an indication of which channels have been determined to be active based upon the determination, wherein, per zone, a channel is active;

receiving content data from the encoders of the active channels; and generating the multi program transport stream output from the received content data.

2. The computer-implemented method of claim 1, wherein the complexity data includes a sequence number, an encoder identifier, start and end timestamps for an associated frame, a complexity score, or a quality score indicates a quality of an encoding.

3. The computer-implemented method of claim 1, wherein the indication is provided as a part of rate control information.

4. A computer-implemented method comprising:
receiving complexity data and quality data per frame per encoder of each channel of a first zone of a provider network, wherein a first channel of the first zone is associated with a first source and a second channel of the first zone is associated with a second source;
receiving complexity data and quality data per frame per encoder of each channel of a second zone of the provider network, wherein a third channel of the second zone is associated with the first source and a fourth channel of the second zone is associated with the second source;
determining, based on the received complexity data and quality data, which channels are to be active, wherein an active channel's content data is to be included in a multi program transport stream output;
providing an indication of which channels have been determined to be active based upon the determination;
receiving content data from the encoders of the active channels; and
generating the multi program transport stream output from the received content data.

5. The computer-implemented method of claim 4, wherein the complexity data includes a sequence number, an encoder identifier, start and end timestamps for an associated frame, a complexity score, or an indication of a quality to be used in encoding.

6. The computer-implemented method of claim 4, wherein the quality data is based on one or more of:
when the frame is from a synchronization fill, wherein the synchronization fill is a repetition of frames or an insertion of black or slate frames;
when the frame is from the source;
whether there are continuity errors associated with the source;
whether responses to rate control information are received on time; or
a trade-off between speed and quality settings of the encoder for the frame.

7. The computer-implemented method of claim 4, wherein determining, based on the received complexity data and quality data, which channels are to be active comprises:
maintaining a count of a number of errors over a sliding window per encoder;
maintaining a state for each encoder based on the count; and
determining which encoders are to be active based on the maintained states,
and wherien the content data of the active channels is received as a Single Program Transport Stream.

8. The computer-implemented method of claim 4, wherein the indication is provided as a part of rate control data to suppress an output of one or more of an encoder and a channel.

9. The computer-implemented method of claim 8, wherein the rate control data includes a sequence number, encoder identifier, start and end timestamps, or a bitrate allocation for the associated frame.

10. The computer-implemented method of claim 4, wherein the content data from an active encoder is a Single-Program Transport Stream.

11. The computer-implemented method of claim 4, wherein encoders that are not active do not transmit a content data.

12. The computer-implemented method of claim 4, wherein the determining, based on the received complexity data and quality data, which channels are to be active comprises determining a state of encoders of the channels and selecting which channels are active based at least in part on the determined states.

13. The computer-implemented method of claim 12, wherein the state is determined by at least evaluating a number of errors for each encoder over a sliding window.

14. The computer-implemented method of claim 12, wherein upon a determination that the state of an encoder is failing, one or more requirements followed upon a failover to a different encoder, the requirements include requiring the failover encoder to produce a particular frame type.

15. A system comprising:
a plurality of media channels implemented by a first one or more electronic devices; and
a statistical mulitplexer implemented by a one or more electronic devices, the statistical mulitplexer including instructions that upon execution cause the statistical mulitplexer to:
receive complexity data and quality data per frame per encoder of each channel of a first zone of a provider network, wherein a first channel of the first zone is associated with a first source and a second channel of the first zone is associated with a second source,
receive complexity data and quality data per frame per encoder of each channel of a second zone of the provider network, wherein a third channel of the second zone is associated with the first source and a fourth channel of the second zone is associated with the second source,
determine, based on the received complexity data and quality data, which channels are to be active, wherein an active channel's content data is to be included in a multi program transport stream output,
provide an indication of which channels have been determined to be active based upon the determination,
receive content data from the encoders of the active channels, and
generate the multi program transport stream output from the received content data.

16. The system of claim 15, wherein the complexity data includes a sequence number, an encoder identifier, start and end timestamps for an associated frame, a complexity score, or an indication of a quality to be used in encoding.

17. The system of claim 15, wherein the quality data is based on one or more of:
when the frame is from a synchronization fill, wherein the synchronization fill is a repetition of frames or an insertion of black or slate frames;
when the frame is from the source;

whether there are continuity errors associated with the source;

whether responses to rate control data are received on time; or a trade-off between speed and quality settings of the encoder for the frame.

18. The system of claim 15, wherein the indication is provided as a part of rate control data.

19. The system of claim 18, wherein the rate control data includes a sequence number, encoder identifier, start and end timestamps, or a bitrate allocation for the associated frame.

20. The system of claim 15, wherein the content data from an active encoder is a Single-Program Transport Stream.

* * * * *